Dec. 29 1925.

G. H. MILLER 1,567,535

FULL FASHIONED STOCKING AND ART OR METHOD OF MAKING THE SAME

Filed May 13, 1925     7 Sheets-Sheet 1

Inventor:
George H. Miller,
by Mark W. Coolett, Atty.

Dec. 29 1925.  G. H. MILLER  1,567,535

FULL FASHIONED STOCKING AND ART OR METHOD OF MAKING THE SAME

Filed May 13, 1925   7 Sheets-Sheet 2

Inventor:
George H. Miller,
by Mark W. Collet
Atty

Dec. 29, 1925. 1,567,535
G. H. MILLER
FULL FASHIONED STOCKING AND ART OR METHOD OF MAKING THE SAME
Filed May 13, 1925     7 Sheets-Sheet 3

Inventor:
George H. Miller,
by Mark W. Collet,
Atty

Dec. 29, 1925.                                                    1,567,535
G. H. MILLER
FULL FASHIONED STOCKING AND ART OR METHOD OF MAKING THE SAME
Filed May 13, 1925         7 Sheets-Sheet 4
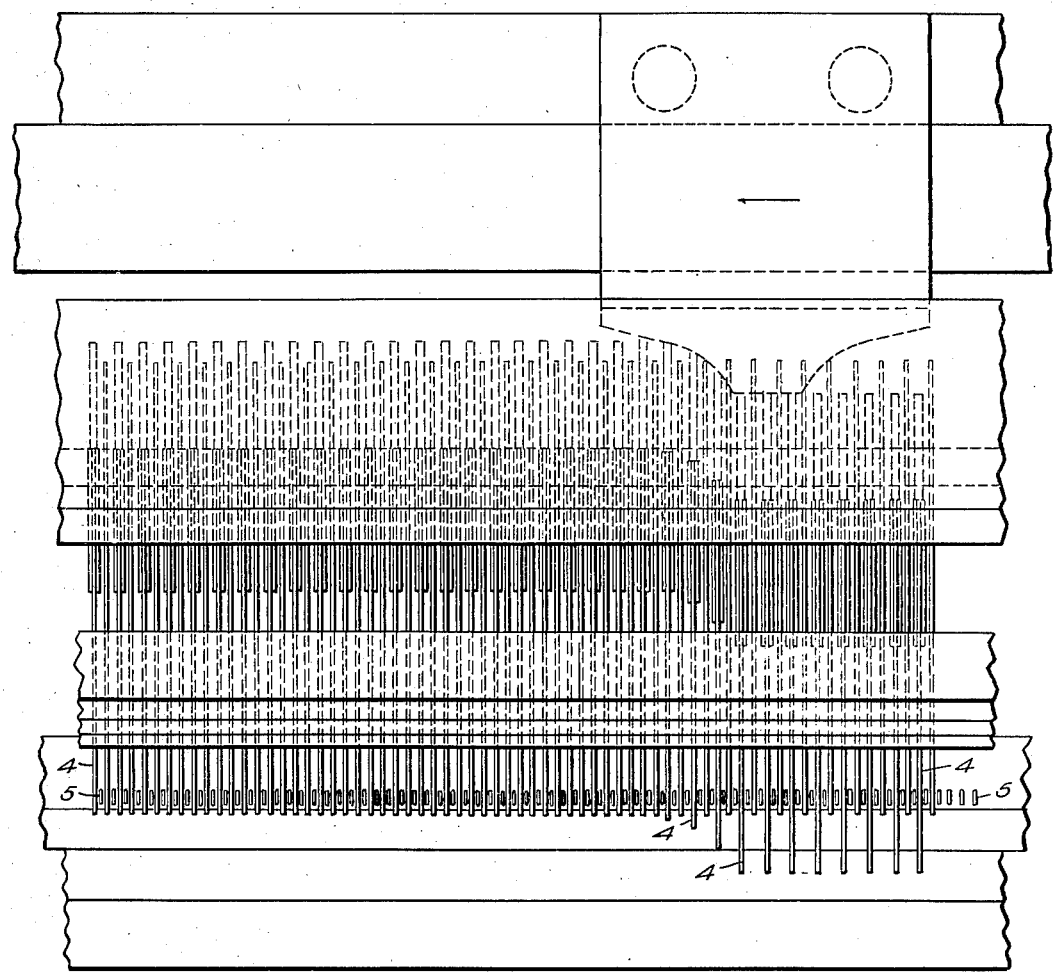
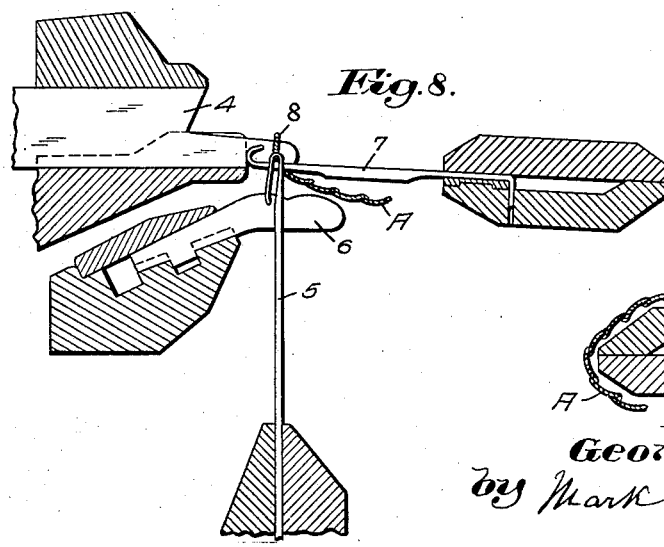
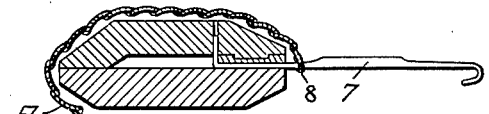
Inventor:
George H. Miller,
by Mark W. Collet
Atty.

Dec. 29, 1925.  
G. H. MILLER  
1,567,535  
FULL FASHIONED STOCKING AND ART OR METHOD OF MAKING THE SAME  
Filed May 13, 1925   7 Sheets-Sheet 5
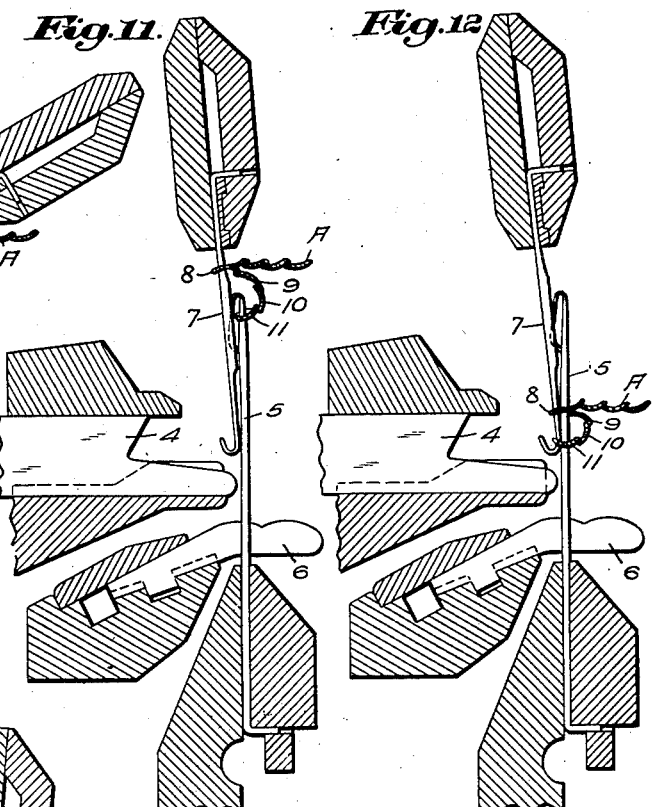
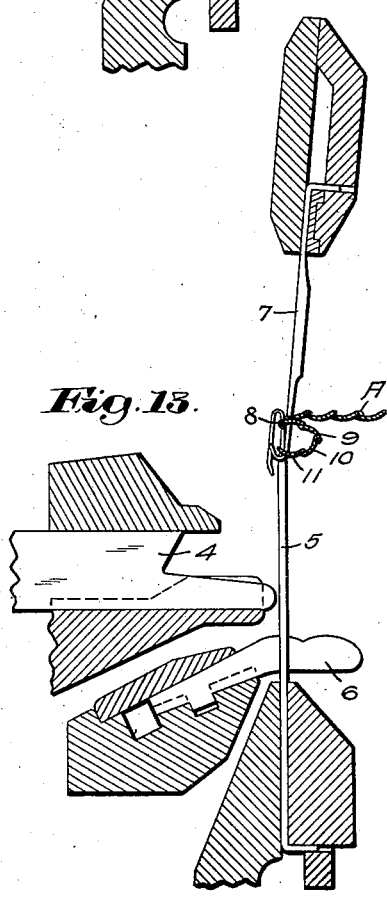

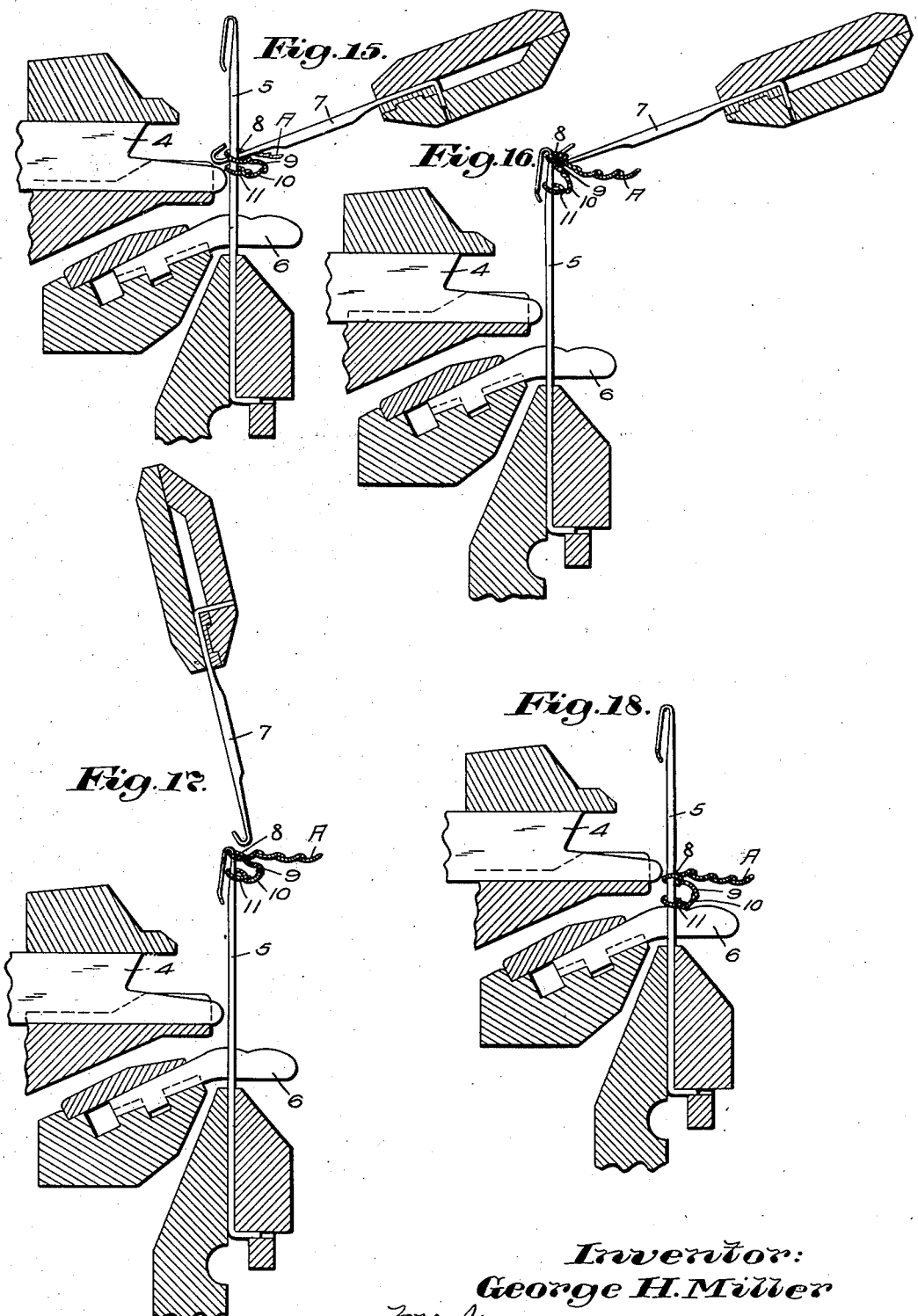

Dec. 29 1925.

G. H. MILLER 1,567,535

FULL FASHIONED STOCKING AND ART OR METHOD OF MAKING THE SAME

Filed May 13, 1925     7 Sheets-Sheet 7

Inventor:
George H. Miller,
by Mark in Collet
Atty

Patented Dec. 29, 1925.

1,567,535

UNITED STATES PATENT OFFICE.

GEORGE H. MILLER, OF PHILADELPHIA, PENNSYLVANIA, ASSIGNOR TO ARCADIA FULL FASHIONED HOSIERY CORPORATION, OF PHILADELPHIA, PENNSYLVANIA, A CORPORATION OF DELAWARE.

FULL-FASHIONED STOCKING AND ART OR METHOD OF MAKING THE SAME.

Application filed May 13, 1925. Serial No. 29,986.

*To all whom it may concern:*

Be it known that I, GEORGE H. MILLER, a citizen of the United States, and a resident of Philadelphia, in the county of Philadelphia and State of Pennsylvania, have invented an Improvement in Full-Fashioned Stockings and Art or Methods of Making the Same, of which the following description, in connection with the accompanying drawings, is a specification, like characters on the drawings representing like parts.

This application is a continuation as to common subject-matter of my co-pending application Serial No. 601,700, filed November 18, 1922, for stockings and art of making same.

This invention relates to full fashioned stockings and the art or method of making the same.

In order that the principle of my invention may be readily understood, I have in the accompanying drawings disclosed one embodiment of the stocking of my invention and mechanism for making the same, and have indicated therein the preferred mode of operating or controlling said mechanism so as to carry out my art or method and thereby to produce the said stocking.

Fig. 7 in a front elevation of the main parts of the mechanism, other than the hooks, and indicating a stage in the formation of the loops or stitches; and Figs. 8 to 22 inclusive, indicate in vertical section successive steps in the formation of the said ridge, excepting Fig. 14, which is a front elevation of the parts in the position indicated in Fig. 13.

The stocking of my invention is a full fashioned one, and may be and desirably is of customary formation except as to the ridge (or ridges) formed in or upon the stocking desirably as herein disclosed at the outer face thereof in any desired place or places to prevent runs, but desirably formed at or below the lower edge of the so-called welt at the upper end of the stocking. It is therefore unnecessary to describe at length either the stocking or the mechanism by which it is formed, it being pointed out that the leg may be formed in one machine (customarily equipped to knit about eighteen or twenty legs simultaneously each from its own thread), which are thereafter transferred to a so-called "footer" by which the foot is formed, or in suitable cases the entire stocking may be formed upon the one machine, my invention being in no wise limited in this respect.

Figure 1:
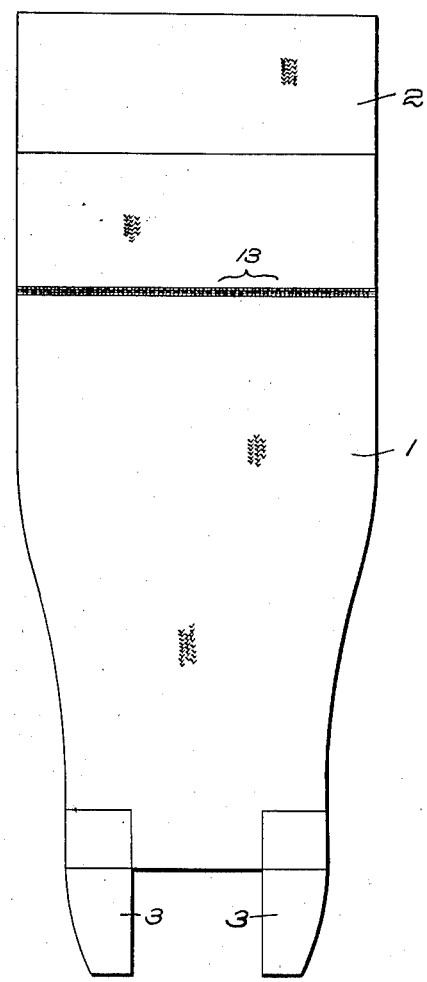
Fig. 1 is a plan view of the outer face of a blank of a full fashioned stocking leg and indicating thereon the anti-ravel ridge or formation to prevent runs in either direction, and particularly from the garter top.

The stocking leg blank is indicated at 1 in Fig. 1, the welt being indicated at 2, and a portion of the heel blanks at 3, said Fig. 1, showing the outer face of the fabric.

In the several views, excepting Figs. 1 to 4, the sinkers are indicated at 4. They may be and desirably are of usual formation and need not be particularly described either as to their structure or mode of operation, it being sufficient to state that after the thread has been laid across the needles 5, herein shown as vertical, the sinkers enter between every two needles, thereby sinking the thread, being actuated independently and in sequence, and being followed in their action by the dividers which enter between those needles where no sinkers are present, and also followed at the proper time by the knocking over bits 6.

It may be assumed that the stocking is begun in usual or customary manner at the upper end, and that a welt 2 is knitted at the upper end in any usual manner, though this is not essential to my invention, and the presence or absence of said welt is immaterial so far as my invention is concerned. I have already stated that one or more so-called ridges may be formed in the practice of my invention, and that it or they may be formed at any desired point or points in the stocking to accomplish the desired result. Therefore, such a ridge may be formed in the welt itself (if a welt be employed) or such a ridge may be at or below the lower edge of the welt, but it is always formed materially subsequent to the commencement of the knitting as desirably as hereinbefore disclosed upon the outer face of the fabric.

In actual practice, I prefer to form the ridge (encircling the stocking leg where the latter is seamed) about nine inches from the top of the stocking, though obviously my invention is in no wise limited in this respect. The said ridge is desirably a substantially solid or compact formation, appearing herein upon the outer face of the stocking and in the making of which ridge a plurality of courses participate, such plurality being herein indicated as four, but obviously such plurality may be varied somewhat within the scope and purpose of my invention, as for example by causing three courses so to participate or a number of courses not greatly in excess of four, which latter number I have found in practice to give the best results.

Assuming therefore that the point in the stocking formation has been reached where it is desired to form the said ridge, which completely encircles the stocking and as hereinbefore disclosed upon its outer face when the latter is completed, I preferably proceed as follows, it being understood that such description is merely of the preferred mode of procedure, and that the article of my invention may be otherwise constructed and that therefore I am not limited to the precise steps or order of steps now to be described, nor to the precise structure thereby produced.

Desirably I at this point knit a loose course, but without as yet casting off the stitches, the needles 5 being drawn down so that the loops or stitches are held at a point where the sinkers and dividers are desirably about one quarter of an inch in front of the needles. With the parts in this position, the so-called welt hooks, which are indicated at 7 in the various Figs. 8 to 17 inclusive, and which are fixedly held in a so-called welt bar and are in number desirably equal to the number of knitting needles, are slid inwardly into position along suitable guide or supporting strips into the position shown in Fig. 8, being caused to enter respectively into or to receive the said loose loops as indicated in Figs. 8 and 9, reference being also made to Fig. 10 wherein I have clearly indicated at 8 one of the loops of this course, which is entered by the said hooks. While these welt hooks may be automatically controlled or operated in carrying out my method and practicing my art and thereby producing the article or product of my invention, preferably they are manually manipulated or operated, since they are caused to go through various movements, which, if automatically imparted, would add to or greatly increase the complexity of the mechanism. Without, therefore, in any way excluding the automatic and properly timed movements of the said welt hooks, I will herein refer to the movements as manually imposed, but merely for descriptive purposes and in no wise as limiting or restricting my invention.

The welt hooks having been brought into the position shown in Fig. 8, the needles draw the loops down onto the said hooks as indicated in said figure, and in this way the said hooks are caused, as previously stated, to enter respectively into or to receive the said loops, and the said loops are in the ensuing operation cast off.

The thread (which is desirably the same identical thread that knits the parts of the stocking immediately preceding and immediately succeeding the said ridge, and which ridge is therefore of the same color as the stocking, or immediately adjacent parts of the stocking) is now laid a suitable number of times across all the needles, such number of courses being desirably and as herein indicated four in number excluding said first mentioned slack course, though, as previously stated, my invention is not restricted or limited thereto. During the laying of these four courses, being two to the left and two to the right, the thread is still retained in the said welt hooks 7 and the stitches are completed and cast off in each course in usual manner. Of the said four courses following the slack courses, the first of the said four courses is also a slack course, this being desirable but not essential, though by forming such second slack course I have obtained the best results.

Referring now to Fig. 10, the four courses referred to are indicated at 8, 9, 10 and 11, the old or preceding portion of the work being indicated at A in said Fig. 10 and in other figures.

Each of the welt hooks 7 is provided with a longitudinal groove in its back, for the purpose of permitting the following steps or certain of them to be carried out in a satisfactory manner.

The course of loops that is now (see

Fig. 10) upon the welt hooks is now to be transferred back to the needles, but before such act of transfer the welt bar carrying the said welt hooks is now moved to the left or to the right, as desired, any suitable number of needles, and the stitches are then transferred back to the needles by placing the said grooves so that the hooks of the needles are received therein as indicated in Fig. 11. Such lateral transfer or shift is desirably uniformly one needle throughout the course, but within the scope of my invention the lateral shift may be uniformly two needles throughout the course. While a greater lateral shift than two is not necessarily excluded as beyond the scope of my invention, it is obvious that such a transfer would impose greater strain upon the thread and is believed to be unnecessary. The number of courses participating in the formation of the ridge is not fixed, being in any case sufficient to form a substantially prominent but compact ridge and as herein disclosed upon the outer face of the stocking.

In effecting the said transfer of the loops back to the needles, the welt bar, which has been in the position indicated in Fig. 8 is inverted or turned through 180° into the position shown in Fig. 9, so as to get the loops or stitches to the base of the welt hooks, after which the welt bar is turned back again and are brought into the position shown in Fig. 11, and in effecting the said transfer of the loops from the hooks to the needles the movements indicated in Figs. 11 to 16 are gone through with, the hooks being released from the loops by the movement indicated in Fig. 17.

Figure 19:
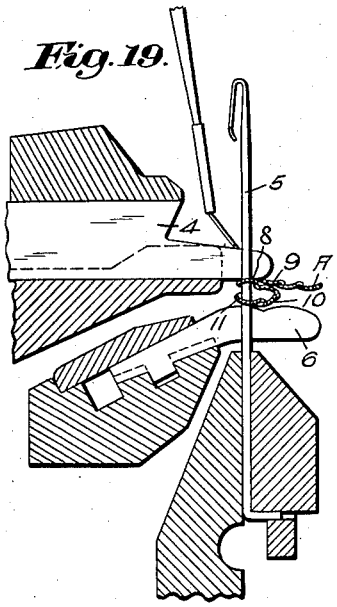
Figure 20:
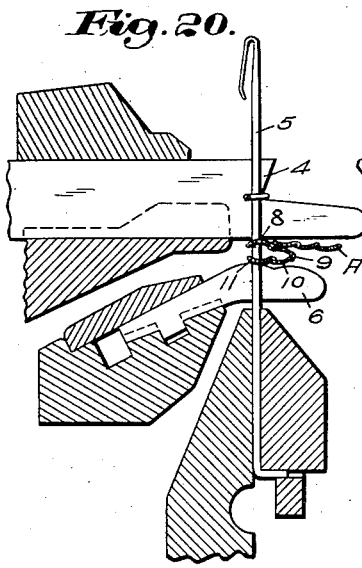
Figure 21:
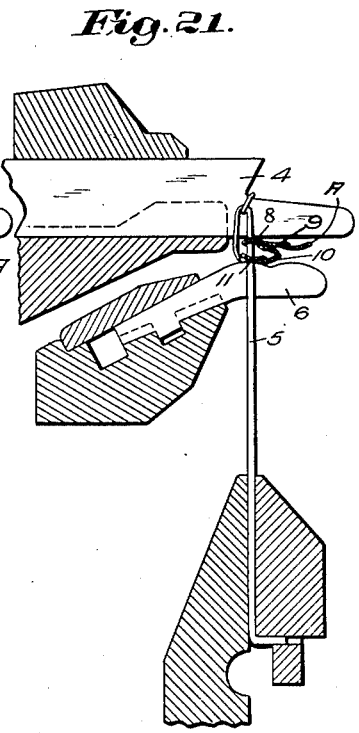
Figure 22:
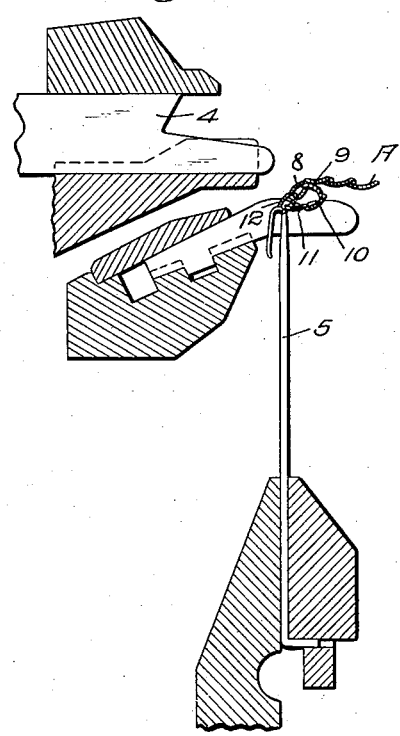

The two loops on each needle are now to be brought to the lower part of each needle and this step in the operation is indicated in Fig. 18. Now, the needles still remaining elevated, another course is laid across all the needles as indicated in Fig. 19, and the loops of this course are completed by the functioning of the usual parts of the mechanism, as indicated in Figs. 20 and 21, and finally the said loops are cast off (Fig. 22 indicating that such step of casting off has occurred), and in so doing the loops of such new course are drawn through the first and fourth loops of the ridge, that is, said new loops, one of which is indicated at 12 in Figs. 2 and 22, are drawn through both loops 8 and 11 of the ridge, thus producing the structure shown in plan in Fig. 4 and indicated in Fig. 2, but shown in an open or hollow condition in Fig. 2, so that the structure may be clear.

Figure 2:
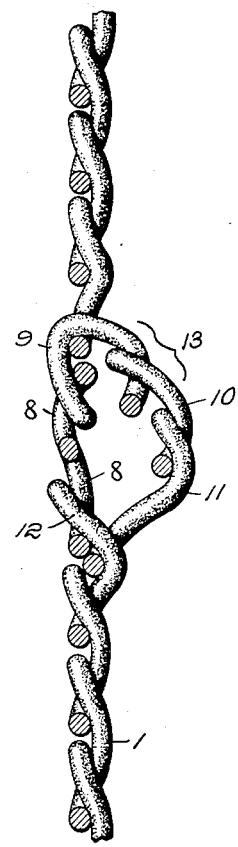
Fig. 2 is a vertical section through a portion of the fabric including said ridge, which latter is shown as though hollow, in order that its structure may be readily apparent, it being understood that in actual practice the said ridge is essentially closed or solid.
Figure 3:
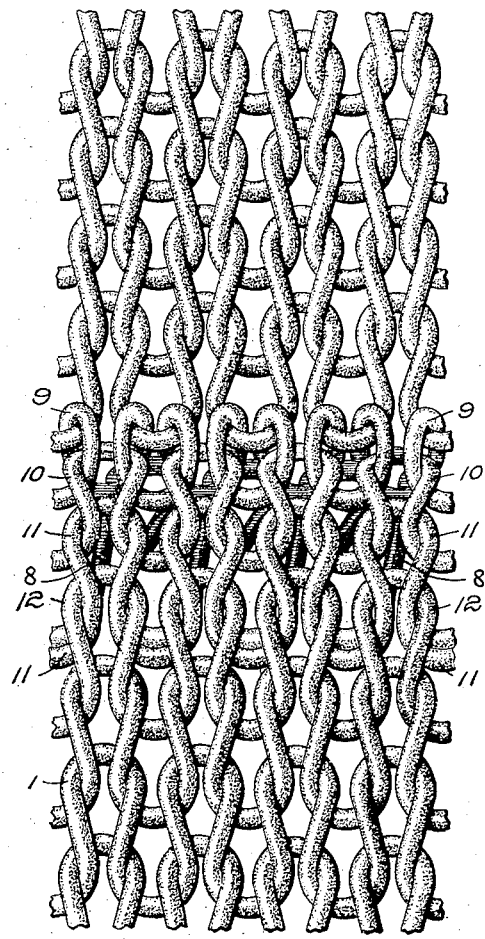
Fig. 3 shows a portion of the front or outside of the completed fabric including a portion of the ridge or formation in completed condition, and clearly indicating that the ridge or formation is at the outer face of the fabric.
Figure 4:
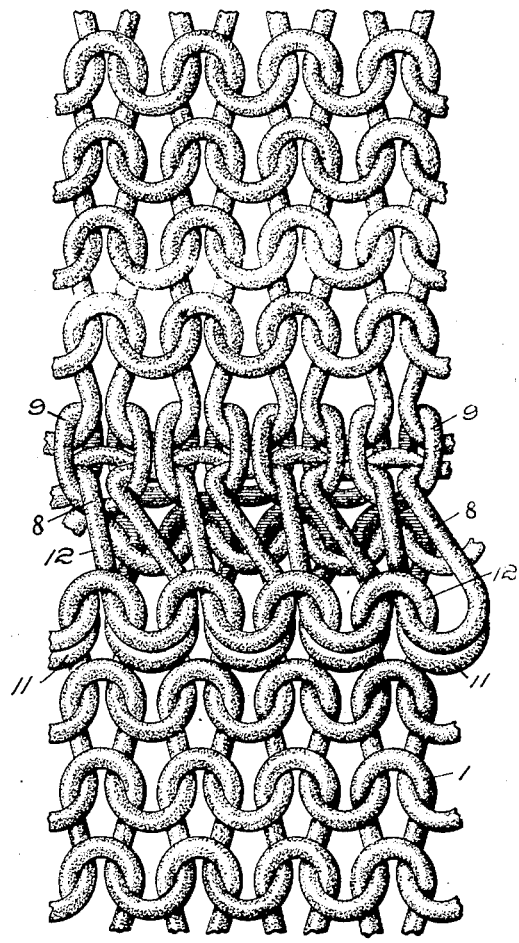
Fig. 4 shows a portion of the back or inside of the completed fabric.
Figure 5:
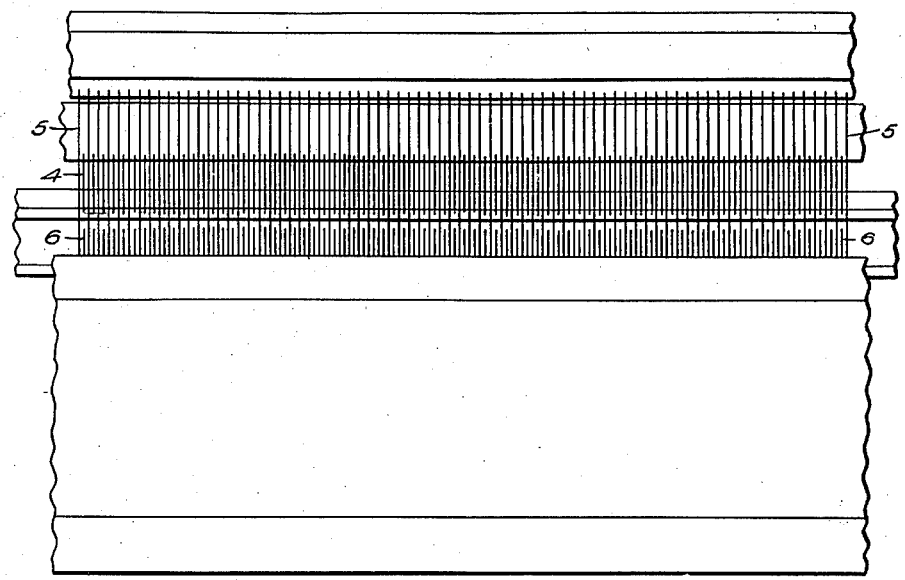
Fig. 5 is a front elevation of a section or portion of the mechanism of a full fashioned knitting machine, by which the fabric of my invention is made and upon or by which my invention may be practiced.
Figure 6:
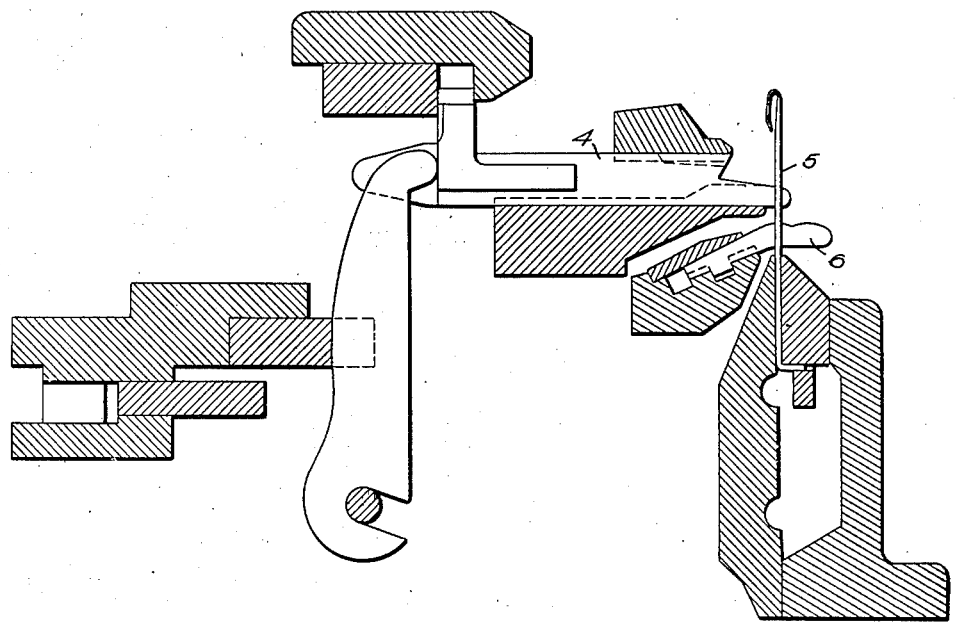
Fig. 6 is a vertical section taken through the mechanism shown in Fig. 5 and indicating the various parts, other than the welt hooks, by which parts the method of my invention is practiced.

The complete ridge or formation is indicated at 13 in Figs. 1 and 2. In Fig. 1, it is shown as extending from one lateral edge or selvage to the opposite lateral edge or selvage, and when the stocking is seamed up the back of the leg (and along the foot) the said ridge or formation extends entirely about the stocking upon the outer face thereof, at the point indicated, or elsewhere, as desired. It will be clear from the foregoing description that the stocking is plain knitted; that is to say, it is knitted upon a single set of needles as plain work and is not of a ribbed construction, as is the characteristic of stockings or parts thereof knitted upon two cooperating sets or banks of needles.

The said ridge, or roll as it may be termed, serves to prevent the formation of runners from the garter, customarily attached or secured to the welt of the stocking, inasmuch as the described formation, with stitches or loops laterally transferred so as each to lie or exist partly in one wale and partly in an adjoining or adjacent wale, throughout the course, effectively locks the adjacent wales with or to each other, so that the breaking of a thread in a course above the lock, contrary to what is the case in stockings knitted in the usual manner, will not permit the spreading out of the thread in the same wale in the course below the lock, and therefore will not permit the thread at the opposite side of the lock from the break to lose their looped form, and so continue down the leg to form a runner. The said locking is effective at whichever side of the ridge, formation or roll the break starts and prevents its spreading to the other side thereof.

It will be evident from an analysis of the structure of the ridge, formation or roll that the entire circumference of the stocking is locked against runners from either direction.

In normal knitting, if the thread of any stitch or needle loop were broken thereat, the needle loop in the next course above in the same wale would be released, so that the thread being released from its loop form would extend horizontally to the next wale, and this disengagement of the stitches or needle loops would progress indefinitely. Similarly, the breaking of any portion of a loop in a sinker wale would extend indefinitely throughout that wale.

In the structure of my invention, however, and in accordance with my method, the ridge-like formation as described constitutes a lock and the thread must break in at least two adjoining wales on either side of the ridge-like formation before any runner can pass to the other side thereof, and even this has been found not to result in a runner, because of the bunched construction of the ridge. This will practically prevent a runner from occurring in a stocking made in accordance with my invention.

The bunching of several courses together, as described, into a substantially solid mass, whereof one of said courses (desirably the last course) is laterally transferred, constitutes an important feature of my invention. The said substantially solid bunching therefore effectively cooperates with the lateral transfer, in the formation of a lock, and the presence of the two features (the bunching and the lateral transfer) in the described ridge, is characteristic of my invention.

The full fashioned stocking of my invention herein disclosed desirably has a welt at its upper end. While my invention is not limited to a stocking having a welt, the ridge desirably occurs below the welt. The ridge consists of a plurality of consecutive courses formed below the welt or below the upper end of the stocking, in the fabric of the leg, each needle wale above said ridge being knitted through the fabric of said ridge to one needle wale of the leg below the ridge and also knitted by lateral transfer into another and different needle wale of the portion of the leg below said ridge, so that each needle wale below the ridge is knitted into its own needle wale and also into another needle wale of the fabric above the ridge and each needle wale of the fabric above the ridge is knitted into its own needle wale, and also by lateral transfer into another needle wale of the fabric below the ridge.

Having thus described one embodiment of the fabric or article of my invention and the best mode known to me for producing the same, I desire it to be understood that although specific terms are employed, they are used in a generic and descriptive sense and not for purposes of limitation, the scope of the invention being set forth in the following claims.

Claims:

1. A full fashioned stocking having below its beginning edge a ridge consisting of all the loops of a plurality of courses formed in the fabric of the leg, each needle wale above the said ridge, being knitted, through the fabric of the said ridge to one needle wale of the leg below the ridge, and also knitted by lateral transfer into another and different needle wale of the portion of the leg below the ridge, so that each needle wale below the ridge is knitted into its own needle wale and also into another needle wale of the fabric above the ridge, and each needle wale of the fabric above the ridge is knitted into its own needle wale and also by lateral transfer into another needle wale of the fabric below the ridge.

2. A full fashioned stocking having a welt at its upper end and a ridge consisting of all the loops of a plurality of consecutive courses formed below the welt in the fabric of the leg, each needle wale above the said ridge, being knitted, through the fabric of said ridge to one needle wale of the leg below the ridge, and also knitted by lateral transfer into another and different needle wale of the portion of the leg below the ridge, so that each needle wale below the ridge is knitted into its own nedle wale and also into another needle wale of the fabric above the ridge, and each needle wale of the fabric above the ridge is knitted into its own needle wale and also by lateral transfer into another needle wale of the fabric below the ridge.

3. A full fashioned stocking having an inturned welt at its upper end and a plain knit leg portion constituting an integral continuation of said welt, said plain knit portion having upon the outer face thereof a run-preventing encircling ridge comprising a plurality of consecutive courses, all of the needle loops whereof have a like form and like position in the fabric and also comprising an immediately succeeding course, all of the needle loops whereof are laterally transferred to terminate the ridge, whereby the portions of the stocking fabric respectively above and below the said ridge are knitted together through said laterally transferred loops and also through continuous needle wales.

4. A stocking having a welt at its upper end and a plain knit leg portion constituting an integral continuation of said welt, said plain knit portion having upon the outer face thereof a run-preventing encircling ridge comprising a plurality of consecutive courses, all of the needle loops whereof have a like form and like position in the fabric and also comprising an immediately succeeding course, all of the needle loops whereof are laterally transferred to terminate the ridge.

5. A stocking having a welt at its upper end and a plain knit leg portion constituting an integral continuation of said welt, said plain knit portion having upon the outer face thereof a run-preventing encircling ridge comprising a plurality of consecutive courses and also comprising an immediately succeeding course, all the needle loops whereof are laterally transferred to terminate the ridge, whereby the portions of the stocking fabric respectively above and below the said ridge are knitted together through said laterally transferred loops and also through continuous needle wales.

6. A stocking having, upon its outer face, below its upper end a ridge consisting of all the loops of a plurality of courses, each needle wale above the ridge being knitted through the fabric of the said ridge to one needle wale of the stocking fabric below the ridge, and also knitted by lateral transfer into another and different needle wale of the portion of the stocking fabric below the ridge, so that each needle wale below the ridge is knitted into its own needle wale and also into another needle wale of the fabric above the ridge, and each needle wale above the ridge is knitted into its own needle wale and also by lateral transfer into another needle wale of the fabric below the ridge.

7. A full fashioned stocking having upon its outer surface below its upper end a ridge consisting of all the loops of a plurality of courses, each needle wale above the said ridge being knitted through the fabric of the said ridge to one needle wale of the stocking fabric below the ridge and also knitted by lateral transfer into another and different needle wale of the portion of the stocking fabric below the ridge, so that each needle wale below the ridge is knitted into its own needle wale and also into another needle wale of the fabric above the ridge and each needle wale of the fabric above the ridge is knitted into its own needle wale and also by lateral transfer into another needle wale of the fabric below the ridge.

8. A full fashioned, plain fabric stocking having upon its outer face below the upper end thereof a ridge formed in and of the plain fabric of the stocking, said ridge being composed of substantially all the loops of a plurality of consecutive courses, each needle wale above the said ridge being knitted, through the fabric of the said ridge, to one needle wale of the stocking fabric below the ridge, and also knitted by lateral transfer into another and different needle wale of the portion of the stocking fabric below the ridge, so that each needle wale below the ridge is knitted into its own needle wale and also into another needle wale of the fabric above the ridge, and each needle wale of the fabric above the ridge is knitted into its own needle wale and also by lateral transfer into the needle wale of the fabric below the ridge.

9. A welted stocking having below the upper end thereof and below said welt a ridge consisting of all the loops of a plurality of courses, each needle wale above the said ridge being knitted through the fabric of the said ridge to one needle wale of the stocking fabric below the ridge and also knitted by lateral transfer into the next adjacent needle wale of the stocking fabric below the ridge, so that each needle wale below the ridge is knitted into two next adjacent needle wales above the ridge and each needle wale of the fabric above the ridge is knitted into two next adjacent needle wales of the fabric below the ridge.

10. A full fashioned, plain knitted stocking having a welt at its upper end and also having upon the outer surface of the stocking a ridge-like, runner-preventing formation continuous about the fabric from edge to edge thereof and formed on every needle wale, said formation being composed of a plurality of consecutive courses, and a course of laterally transferred loops.

11. A plain knitted stocking having a welt at its upper end and also having upon the outer surface of the stocking a ridge-like, runner-preventing continuous formation and formed on every needle wale, said formation being composed of a plurality of consecutive courses, and a course of laterally transferred loops.

12. A full fashioned, plain knitted stocking having an inturned welt at its upper end and having upon the other surface of the stocking, a ridge-like runner-preventing formation continuous about the fabric from edge to edge thereof and formed on every needle wale, said formation being composed of a plurality of consecutive courses, and a course of laterally transferred loops.

13. A full fashioned, plain knitted stocking having an inturned welt at its upper end and having upon the outer surface thereof, a ridge-like runner-preventing formation located wholly below the said welt and continuous about the fabric from edge to edge thereof and formed on every needle wale, said formation being composed of a plurality of consecutive courses, and a course of laterally transferred loops.

14. A stocking having a welt at its upper end and having upon the outer face of the stocking a ridge-like runner-preventing formation consisting of a plurality of consecutive courses, each of which is of uniform character and form throughout the circumference of the stocking as to each needle loop thereof, and a course of laterally transferred loops.

15. A full fashioned stocking having formed upon the outer face thereof wholly below the course at the upper end of the stocking, a ridge-like runner-preventing formation consisting of a plurality of consecutive courses extending throughout the circumference of the stocking and of uniform character and form as to each needle loop thereof, and also a course of laterally transferred loops immediately succeeding said plurality of consecutive courses and constituting therewith the said formation.

16. That method of producing a runner-preventing formation in a full fashioned, plain knitted stocking which has a welt at its upper end consisting in knitting, subsequent to the initial courses of the fabric and subsequent to the formation of the said welt, a ridge consisting of all the loops of a plurality of consecutive courses and also a course of laterally transferred loops, so that each needle wale above the ridge is knitted through the fabric of the said ridge to one needle wale of the stocking fabric below the ridge and is also knitted by the said lateral transfer into another and different needle wale of the portion of the stocking fabric below the ridge.

17. That method of producing a runner-preventing formation in a full fashioned, plain knitted stocking which has a welt at its upper end consisting in knitting, subsequent to the initial courses of the fabric and subsequent to the formation of the said welt, a ridge upon the outer surface of the stocking consisting of all the loops of a plurality of consecutive courses and also a course of laterally transferred loops, so that each needle wale above the ridge is knitted through the fabric of the said ridge to one needle wale of the stocking fabric below the ridge and is also knitted by the said lateral transfer into another and different needle wale of the portion of the stocking fabric below the ridge.

In testimony whereof, I have signed my name to this specification.

GEORGE H. MILLER.